(12) United States Patent
Fu et al.

(10) Patent No.: US 8,411,420 B2
(45) Date of Patent: Apr. 2, 2013

(54) ELECTRONIC DEVICE ASSEMBLY WITH TWO-PART BRACKET

(75) Inventors: Meng Fu, Shenzhen (CN); Chun-Chi Chen, Taipei Hsien (TW); Bang-Jie Xie, Shenzhen (CN)

(73) Assignees: Fu Zhun Precision Industry (Shen Zhen) Co., Ltd., Shenzhen (CN); Foxconn Technology Co., Ltd., New Taipei (TW)

( * ) Notice: Subject to any disclaimer, the term of this patent is extended or adjusted under 35 U.S.C. 154(b) by 303 days.

(21) Appl. No.: 12/914,988

(22) Filed: Oct. 28, 2010

(65) Prior Publication Data

US 2012/0087069 A1 Apr. 12, 2012

(30) Foreign Application Priority Data

Oct. 11, 2010 (CN) .......................... 2010 1 0502764

(51) Int. Cl.
*H05K 7/12* (2006.01)
(52) U.S. Cl. ............... 361/679.01; 361/679.58; 439/529
(58) Field of Classification Search ............ 361/679.02, 361/679.21, 679.01, 679.55–679.58, 679.3, 361/679.41; 710/303–305; 248/917–924, 248/309.1, 225.11; 455/575.1–575.4
See application file for complete search history.

(56) References Cited

U.S. PATENT DOCUMENTS

| 6,794,588 | B2* | 9/2004 | Lin ............................... 200/5 A |
| 7,708,240 | B2* | 5/2010 | Homer et al. .................. 248/130 |
| 2005/0255895 | A1* | 11/2005 | Lee et al. ...................... 455/573 |
| 2009/0009957 | A1* | 1/2009 | Crooijmans et al. .......... 361/686 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An electronic device assembly includes an electronic device and a bracket holding the electronic device. The bracket includes a first supporting seat defined a first receiving groove therein and a second supporting seat defined a second receiving groove therein. The first supporting seat is disengagably attachable to the second supporting seat according to either of two selectable arrangements. In a first one of the arrangements, the first receiving groove and the second receiving groove cooperatively define a first receiving chamber having a first width for holding the electronic device in a first orientation. In a second one of the arrangements, the first receiving groove and the second receiving groove cooperatively define a second receiving chamber having a second width for holding the electronic device in a second orientation.

20 Claims, 5 Drawing Sheets

ELECTRONIC DEVICE ASSEMBLY WITH TWO-PART BRACKET

CROSS-REFERENCE TO RELATED APPLICATION

This application is related to a co-pending application entitled "CONSUMER ELECTRONIC PRODUCT ASSEMBLY WITH BRACKET" Ser. No. 12/914,990, assigned to the same assignee of this application and filed on the same date as this application. The related application is incorporated herein by reference.

BACKGROUND

1. Technical Field

The present disclosure relates to electronic devices, and more particularly to an electronic device assembly having a bracket and an electronic device supported by the bracket.

2. Description of Related Art

As electronic products continue to develop, portable AV (audiovisual) products are becoming widely used. These portable AV products include LCDs (liquid crystal displays), portable DVD (digital video disc) players, tablet PCs (personal computers), mobile phones, etc. A bracket is generally used to support the portable AV product on a desk or another kind of supporting surface. However, the bracket is secured on the portable AV product and cannot change its position with respect to the portable AV product. Such supporting of the portable AV products cannot meet consumers' requirements for displaying of the video image at different orientations.

It is desirable to provide an electronic device assembly with a bracket which can overcome the described limitations.

DETAILED DESCRIPTION

Figure 1:
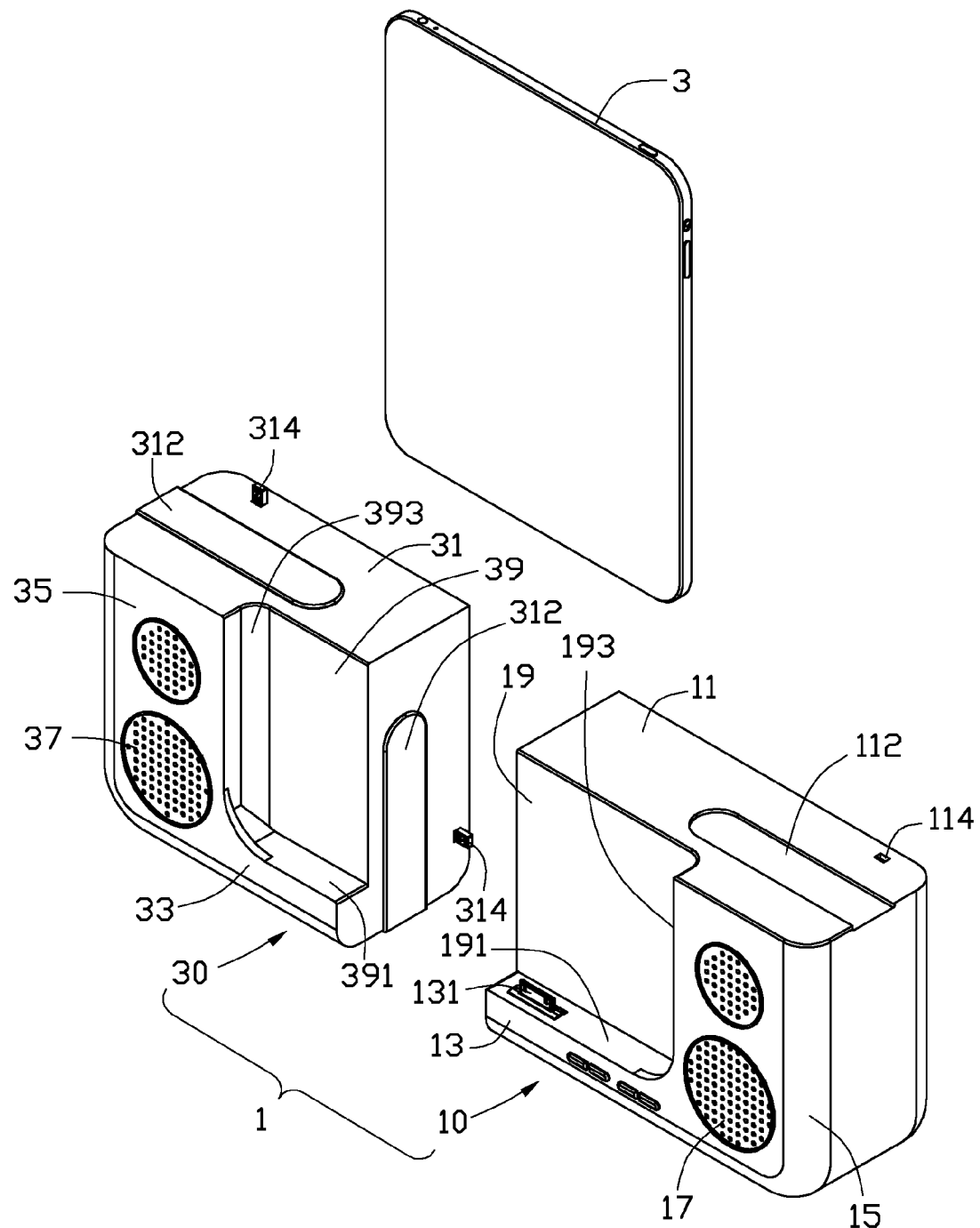
FIG. 1 is an exploded view of an electronic device assembly according to an exemplary embodiment of the present disclosure.
Figure 2:
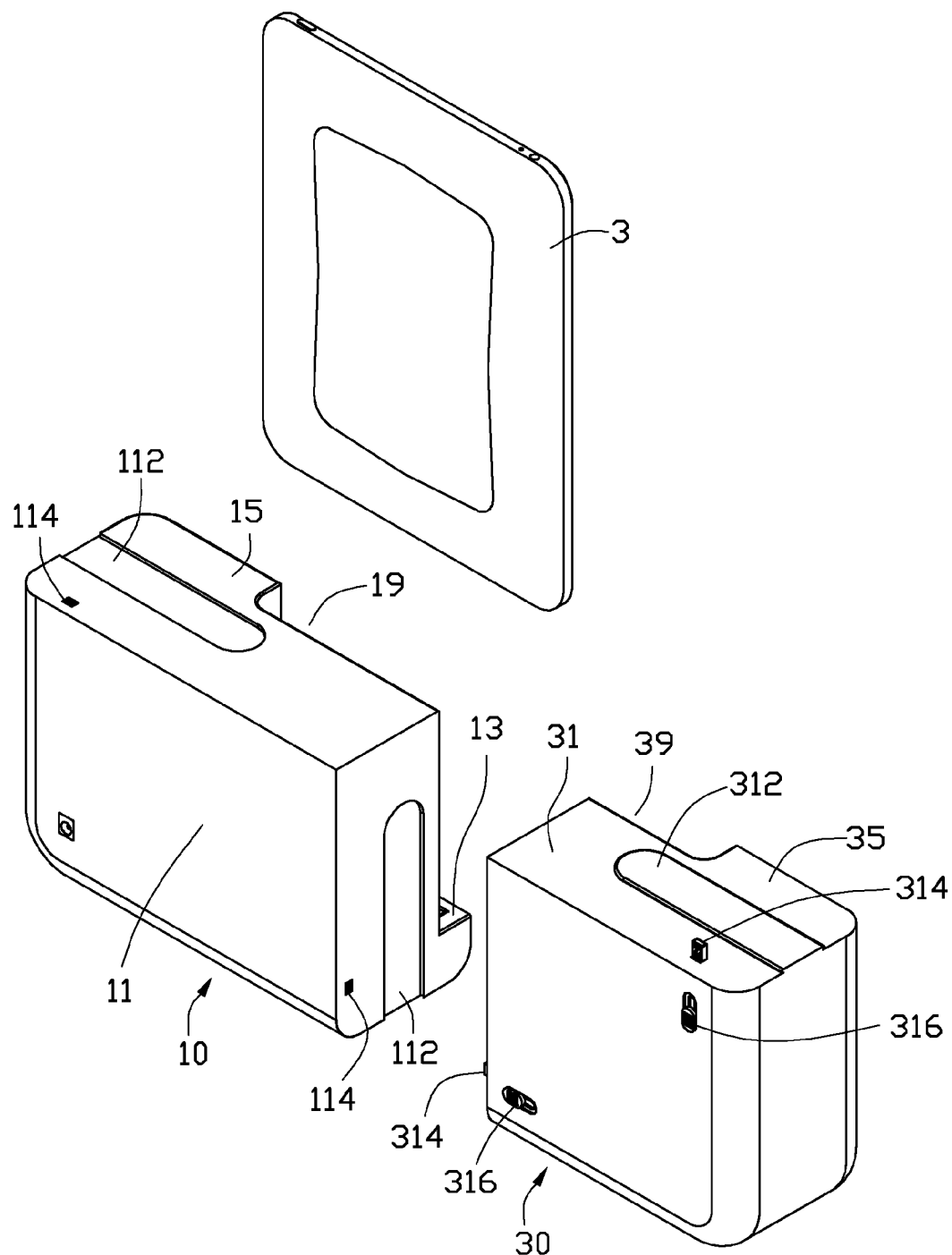
FIG. 2 is similar to FIG. 1, but shown from another aspect.

Referring to FIGS. 1-2, an electronic device assembly is shown. The electronic device assembly includes an electronic device 3, and a bracket 1 holding the electronic device 3.

In the description that follows, the stated orientations of all of the elements of the electronic device assembly are with reference to the orientations of all of the elements as shown in FIG. 1.

The electronic device 3 is typically a portable AV device, such as an LCD, portable DVD player, tablet PC, mobile phone etc. In this embodiment, the electronic device 3 is thin and essentially rectangular.

The bracket 1 includes a first supporting seat 10, and a second supporting seat 30 removably attached to the first supporting seat 10.

The first supporting seat 10 includes a rectangular main body 11, a supporting bar 13, and a hollow cover 15. A top surface of the main body 11 is longer than a left surface of the main body 11. The supporting bar 13 is elongated and configured to support part of the electronic device 3. The supporting bar 13 extends rightward from a bottom left corner of a front of the main body 11. A left end of the supporting bar 13 and the left surface of the main body 11 are coplanar. An electrical connecter 131 extends from a top surface of the supporting bar 13 to electronically connect to the electronic device 3. The cover 15 is generally rectangular, and covers a right side of the front of the main body 11. A right end of the supporting bar 13 adjoins a left side of a bottom end of the cover 15 to form an L-shaped configuration. Top and bottom ends of the cover 15 are coplanar with top and bottom surfaces of the main body 11, respectively. Loudspeakers 17 are arranged on the main body 11 and covered by the cover 15 to output audio signals of the electronic device 3.

The main body 11, the supporting bar 13 and the cover 15 cooperatively define a first receiving groove 19 therebetween. The top surface of the supporting bar 13 is a first boundary 191 of the first receiving groove 19. A left surface of the cover 15 is a second boundary 193 of the first receiving groove 19. The first boundary 191 and the second boundary 193 are elongated and adjoin each other. The first boundary 191 is equal in width to the second boundary 193, and is longer than the second boundary 193.

Two first latching portions 112 are defined in the top surface and left surface of the main body 11, respectively. In this embodiment, each first latching portion 112 is a U-shaped groove. One of the first latching portions 112 is located at a front side of the top surface of the main body 11, and extends rightwards from a middle portion of the top surface of the main body 11 to the rightmost end of the top surface of the main body 11. The other first latching portion 112 is located at a front side of the left surface of the main body 11 and extends from a middle portion of the left surface of the main body 11 to the bottommost end of the left surface of the main body 11 (see FIG. 2). Two first connecting portions 114 are formed on rear sides of the top and left surfaces of the main body 11, respectively. In this embodiment, each first connecting portion 114 includes a rectangular hole.

The second supporting seat 30 is similar to the first supporting seat 10, and includes a rectangular main body 31, a supporting bar 33 and a hollow cover 35. A length of a right surface of the main body 31 is equal to that of the left surface of the main body 11 of the first supporting seat 10. A top surface of the main body 31 is shorter than the top surface of the main body 11. The supporting bar 33 is elongated and configured to support another part of the electronic device 3. The supporting bar 33 extends from a bottom right corner of a front of the main body 31. A right end of the supporting bar 13 and the right surface of the main body 31 are coplanar. The cover 35 is generally rectangular, and covers a left side of the front of the main body 31. A left end of the supporting bar 33 adjoins a right side of a bottom end of the cover 35 to form an L-shaped configuration. Top and bottom ends of the cover 35 are coplanar with top and bottom surfaces of the main body 31, respectively. Loudspeakers 37 are arranged on the main body 31 and covered by the cover 35 to output audio signals of the electronic device 3.

The main body 31, the supporting bar 33 and the cover 35 cooperatively define a second receiving groove 39 therebetween. A top surface of the supporting bar 33 is a first boundary 391 of the second receiving groove 39. A right surface of the cover 35 is a second boundary 393 of the second receiving groove 39. The first boundary 391 and the second boundary 393 are elongated and adjoin each other. The first boundary 391 is equal in width to the second boundary 393, and shorter than the second boundary 193. The first boundary 391 is shorter than the first boundary 191 of the first receiving groove 19. The second boundary 393 is equal in length to the second boundary 193 of the first receiving groove 19. A width of the second boundary 393 is equal to that of the second boundary 193.

Two second latching portions 312 are formed on the top surface and right surface of the main body 31, respectively. In this embodiment, each second latching portion 312 is a U-shaped plate protruding from the corresponding surface, and can be received in a corresponding first latching portion 112 of the main body 11 of the first supporting seat 10. One of the second latching portions 312 is located at a front side of the top surface of the main body 31 and extends rightwards from the leftmost end of the top surface along a direction parallel to the first boundary 391. The other second latching portion 312 is located at a front side of the right surface of the main body 31 and extends upwards from the bottommost end of the right surface along a direction parallel to the second boundary 393. The second latching portion 312 at the right surface of the main body 31 corresponds to the first latching portion 112 at the left surface of the main body 11. The second latching portion 312 at the top surface of the main body 31 corresponds to the first latching portion 112 at the top surface of the main body 11.

Two second connecting portions 314 are formed on rear sides of the top surface and right surface of the main body 31, respectively. In this embodiment, each second connecting portion 314 is a rectangular detent that can be received in the corresponding first connecting portion 114. In particular, the second connecting portion 314 at the right surface of the main body 31 corresponds to the first connecting portion 114 at the left surface of the main body 11. The second connecting portion 314 at the top surface of the main body 31 corresponds to the first connecting portion 114 at the top surface of the main body 11. A front surface of each second connecting portion 314 has elastic metallic tabs (not labeled) provided thereon, for electrically connecting with the corresponding first latching portion 112. Thus the connection of either second connecting portion 314 with its corresponding first connecting portion 114 provides both mechanical and electrical utility. That is, the connection of the second connecting portion 314 with the first connecting portion 114 helps avoid the first and second supporting seats 10, 30 detaching from each other, and provides electrical connection between the first and second supporting seats 10, 30.

Two operating portions 316 are formed on the rear surface of the main body 31 (see FIG. 2), and connect the two second connecting portions 314, respectively. Each operating portion 316 is operated by a user to make the corresponding second connecting portion 314 retract or extend with respect to the main body 31.

When the electronic device assembly is used, the first supporting seat 10 can be engaged with the second supporting seat 30 in two different ways. This enables the electronic device 3 to be maintained in two different positions according to a user's particular requirements.

Figure 3:
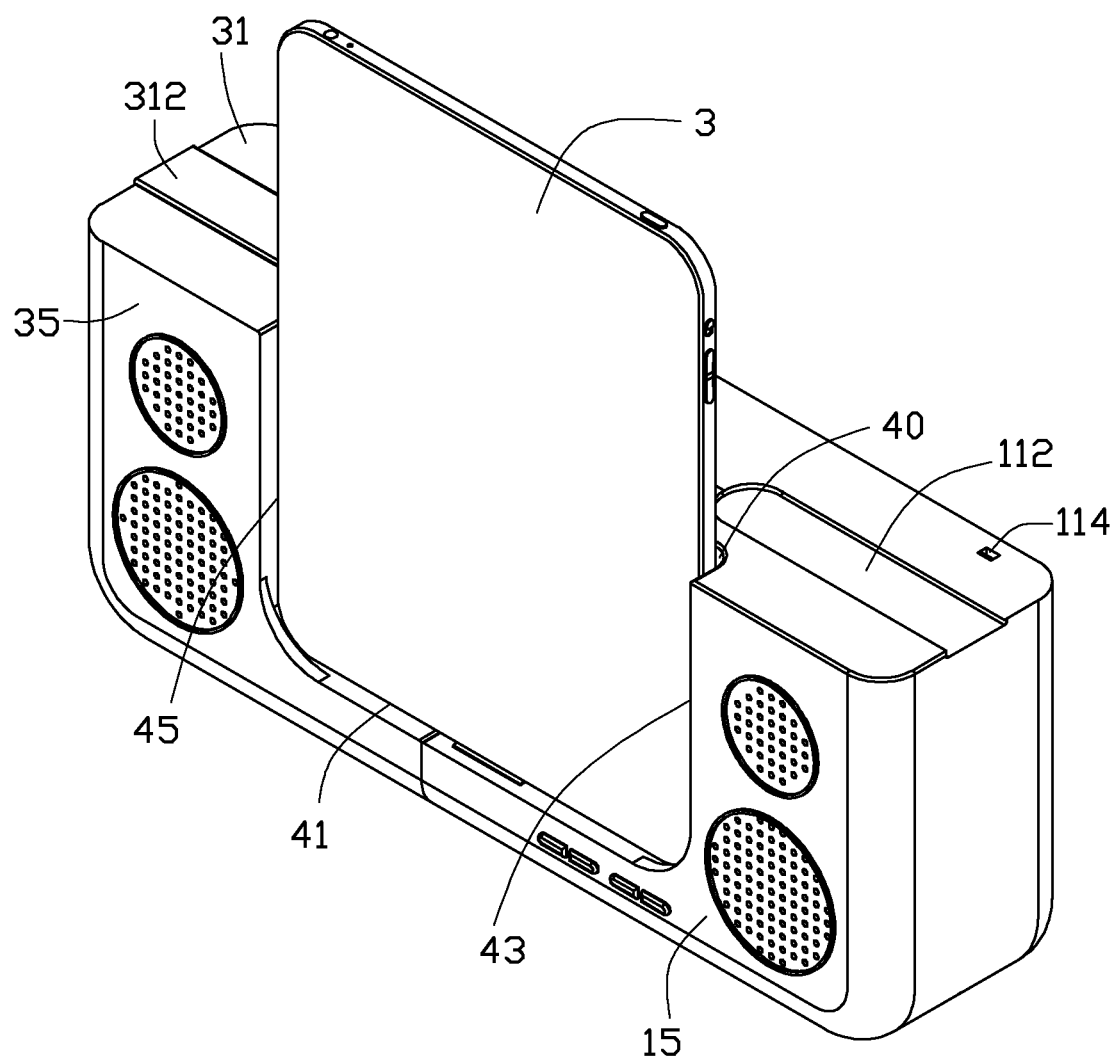
FIG. 3 is an assembled view of the electronic device assembly of FIG. 1, wherein a two-part bracket of the electronic device assembly is assembled according to a first arrangement.

Referring to FIGS. 1-3, when the bracket 1 is assembled according to a first arrangement, the second supporting seat 30 is firstly positioned adjacent to but below the first supporting seat 10. The second latching portion 312 located at the right surface of the second supporting seat 30 is aligned with the first latching portion 112 of the left surface of the first supporting seat 10. The second supporting seat 30 is then elevated to slidingly engage the second latching portion 312 in the first latching portion 112. That is, the second supporting seat 30 is slid along the first latching portion 112 until fully received in the first latching portion 112. Simultaneously, the operating portion 316 connected to the second connecting portion 314 located at the right surface of the second supporting seat 30 is manually operated so that the second connecting portion 314 retracts with respect to the right surface. When the second latching portion 312 is fully received in the first latching portion 112, the operating portion 316 is released and the second connecting portion 314 extends and enters the corresponding first connecting portion 114 of the first supporting seat 10.

In this state, the bracket 1 is completely assembled according to the first arrangement. The top surfaces of the main bodies 10, 30 are coplanar. The first receiving groove 19 communicates with the second receiving groove 39. The first receiving groove 19 and the second receiving groove 39 cooperatively define a rectangular receiving chamber 40. The first boundary 191 of the first receiving groove 19 is located at a lateral side of and aligned with the first boundary 391 of the second receiving groove 39. The first boundary 191 and the first boundary 391 are coplanar and cooperatively form a bottom boundary 41 of the receiving chamber 40. The second boundaries 193, 393 of the first and second receiving grooves 19, 39 function as opposite lateral boundaries 43, 45 of the receiving chamber 40, and are located at opposite sides of the bottom boundary 41.

A short side of the electronic device 3 is received in the receiving chamber 40 of the bracket 1, with the electrical connecter 131 of the supporting bar 13 of the first supporting seat 10 engaging in the electronic device 3. Thus, the electronic device 3 is assembled on the bracket 1. The electronic device 3 is oriented vertically.

Figure 4:
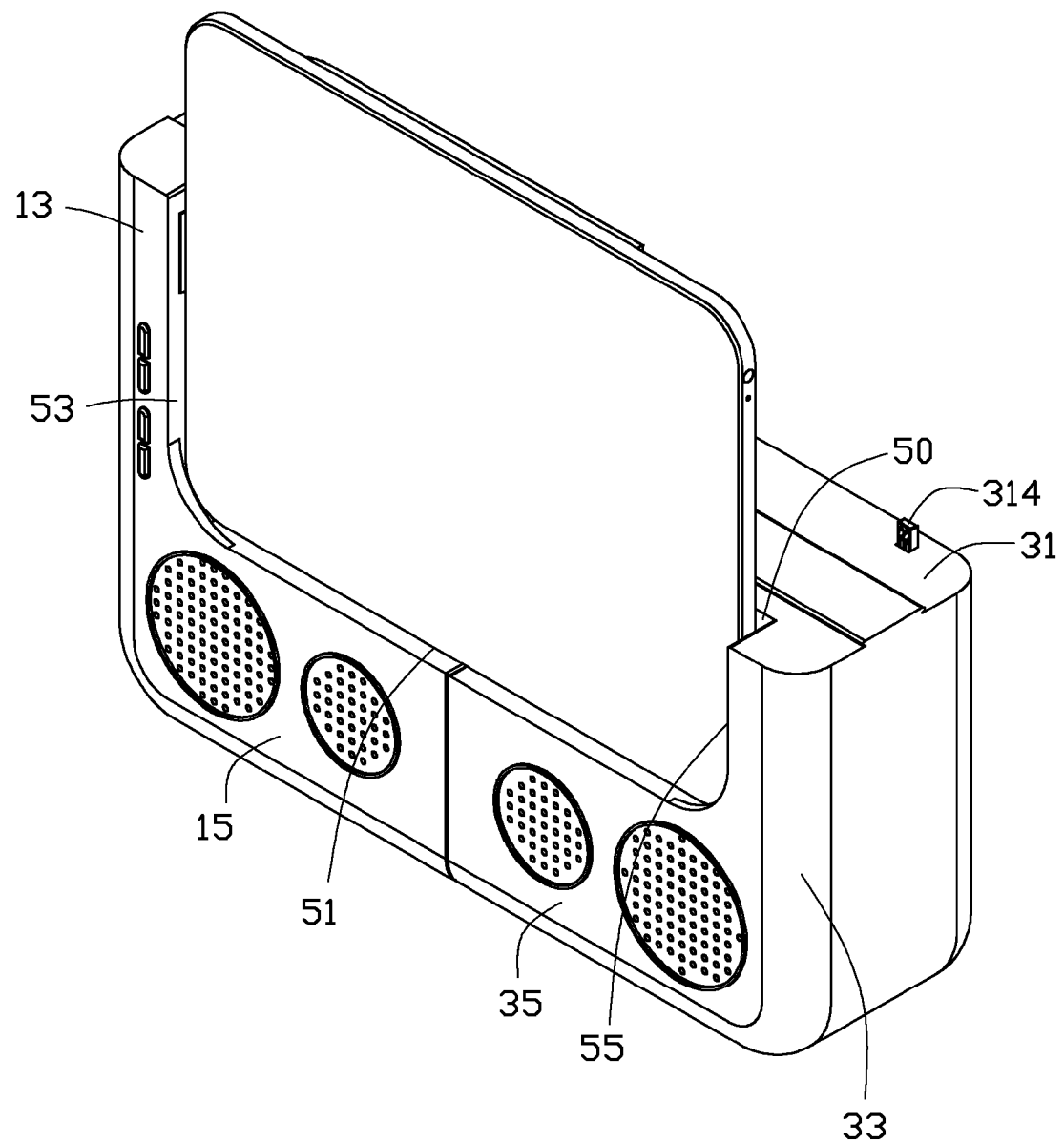
FIG. 4 is an assembled view of the electronic device assembly of FIG. 1, but wherein the two-part bracket of the electronic device assembly is assembled according to a second arrangement.
Figure 5:
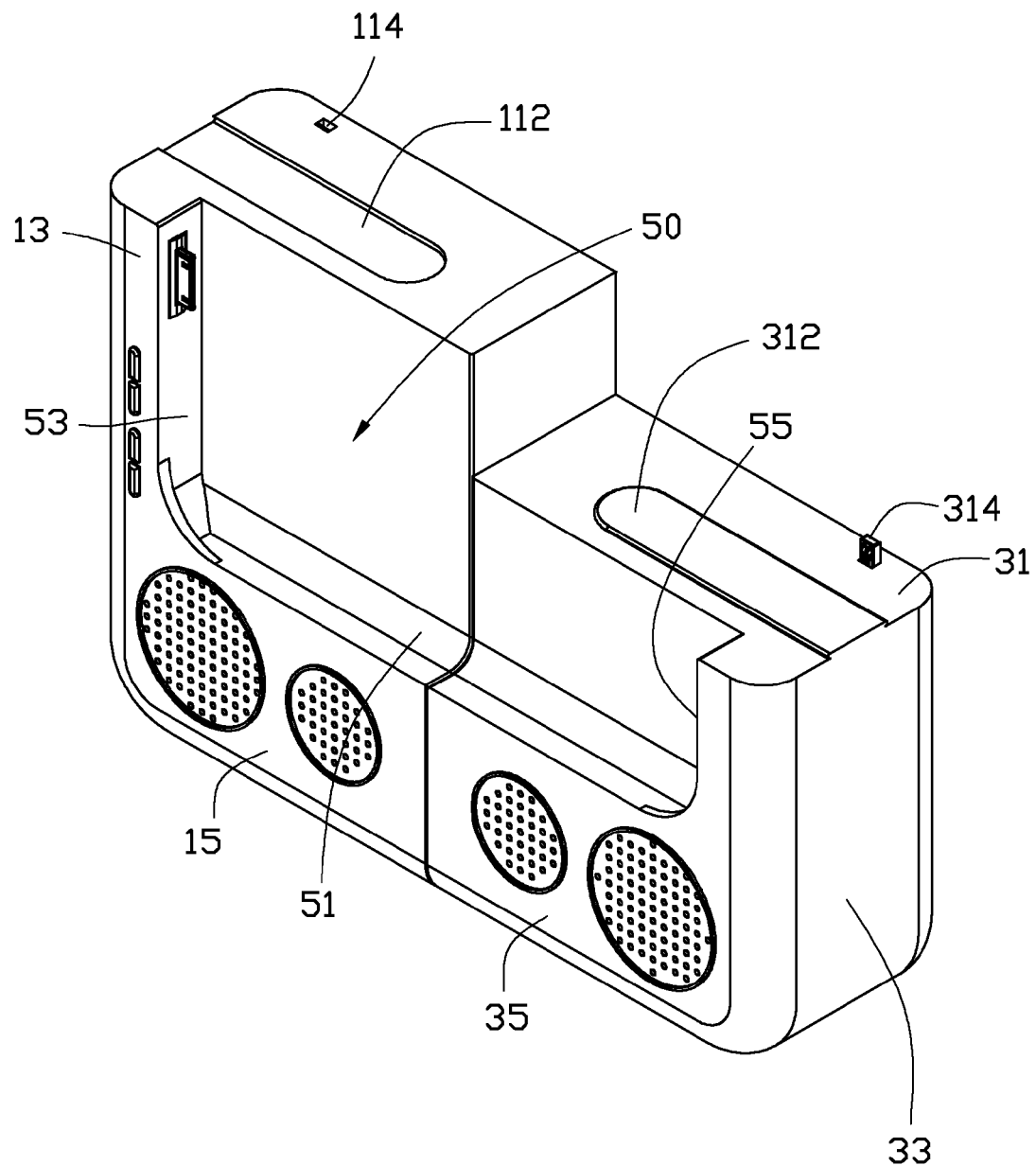
FIG. 5 is similar to FIG. 4, but only shows the two-part bracket.

Referring to FIGS. 1 and 4-5, when the bracket 1 is assembled according to a second arrangement, firstly, the first supporting seat 10 is rotated 90° clockwise and positioned at a left side of the second supporting seat 30. The second supporting seat 30 is rotated 90° counterclockwise until the top surfaces of the main bodies 11, 31 of the first and second supporting seats 10, 30 are parallel to each other. Then the second supporting seat 30 is positioned adjacent to but below the first supporting seat 10. The second latching portion 312 at the top surface of the second supporting seat 30 is aligned with the first latching portion 112 at the top surface of the first supporting seat 10. The second supporting seat 30 is then elevated to slidingly engage the second latching portion 312 in the first latching portion 112. That is, the second supporting seat 30 is slid along the first latching portion 112 until fully received in the first latching portion 112 of the top surface of the main body 11. Simultaneously, the operating portion 316 connected to the second connecting portion 314 located at the top surface of the second supporting seat 30 is manually operated so that the second connecting portion 314 retracts with respect to the top surface. When the second latching portion 312 is fully received in the first latching portion 112, the operating portion 316 is released and the second connecting portion 314 extends and enters the corresponding first connecting portion 114 of the first supporting seat 10.

In this state, the bracket 1 is completely assembled according to the second arrangement. A top end of the main body 11 exceeds a top end of the main body 31. The left surface of the main body 11 is located at a top of and parallel to the right surface of the main body 31. The first receiving groove 19 communicates with the second receiving groove 39. The first receiving groove 19 and the second receiving groove 39 cooperatively define a rectangular receiving chamber 50. The second boundary 193 of the first receiving groove 19 is located at a lateral side of and aligned with the second boundary 393 of the second receiving groove 39. The second boundary 193 and the second boundary 393 are coplanar and cooperatively form a bottom boundary 51 of the receiving chamber 50. The first boundaries 191, 391 of the first and second receiving grooves 19, 39 function as opposite lateral boundaries 53, 55 of the receiving chamber 50, and are located at opposite sides of the bottom boundary 51.

A longer side of the electronic device 3 is received in the receiving chamber 50 of the bracket 1, with the electrical connecter 131 of the supporting bar 13 of the first supporting seat 10 engaging in the electronic device 3. Thus, the electronic device 3 is assembled on the bracket 1. The electronic device 3 is oriented horizontally.

It is to be understood, however, that even though numerous characteristics and advantages of the exemplary embodiment(s) have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A bracket for supporting an electronic device, the bracket comprising:
   a first supporting seat defining a first receiving groove therein, the first receiving groove comprising a first boundary and a second boundary adjoining the first boundary; and
   a second supporting seat defining a second receiving groove therein, the second receiving groove comprising a first boundary and a second boundary adjoining the first boundary;
   wherein the first supporting seat is disengagably attachable to the second supporting seat according to each of two selectable arrangements;
   in a first one of the arrangements, the first receiving groove and the second receiving groove cooperatively define a first receiving chamber having a first width for holding the electronic device in a first orientation, with the first boundaries of the first receiving groove and the second receiving groove aligned with each other and coplanar and cooperatively forming a bottom boundary of the first receiving chamber; and
   in a second one of the arrangements, the first receiving groove and the second receiving groove cooperatively define a second receiving chamber having a second width for holding the electronic device in a second orientation, with the second boundaries of the first and second receiving grooves aligned with each other and coplanar and cooperatively forming a bottom boundary of the second receiving chamber.

2. The bracket of claim 1, wherein two first latching portions are formed at two adjacent surfaces of the first supporting seat, respectively, and two second latching portions are formed at two adjacent surfaces of the second supporting seat, respectively, and each first latching portion is engagable with a corresponding second latching portion to assemble the first and second supporting seats together.

3. The bracket of claim 2, wherein each first latching portion comprises a groove, and each second latching portion comprises a protruding plate slidingly receivable in the groove of the corresponding first latching portion.

4. The bracket of claim 3, wherein the first latching portions extend along directions parallel to the first boundary and the second boundary of the first receiving groove, respectively.

5. The bracket of claim 4, wherein the two second latching portions extend along directions parallel to the first boundary and the second boundary of the second receiving groove, respectively.

6. The bracket of claim 5, wherein a length of the first boundary of the first receiving groove is larger than that of the first boundary of the second receiving groove, and a length of the second boundary of the first receiving groove is approximately equal to that of the second boundary of the second receiving groove and larger than that of the first boundary of the second receiving groove.

7. The bracket of claim 6, wherein the second boundaries of the first and second receiving grooves are located at lateral sides of the bottom boundary and function as lateral boundaries of the first receiving chamber.

8. The bracket of claim 6, wherein the first boundaries of the first and second receiving grooves are located at lateral sides of the bottom boundary and function as lateral boundaries of the second receiving chamber.

9. The bracket of claim 5, wherein the first supporting seat comprises a cubic main body, a supporting bar and a cover, the supporting bar and the cover cooperatively form an L-shaped configuration at a same side of the main body, the first latching portions are defined in two adjacent surfaces of the main body, the first boundary of the first receiving groove is a top surface of the supporting bar, and the second boundary of the first receiving groove is a lateral surface of the cover.

10. The bracket of claim 5, wherein the second supporting seat comprises a cubic main body, a supporting bar and a cover, the supporting bar and the cover cooperatively form an L-shaped configuration at a same side of the main body, the second latching portions are formed on two adjacent surfaces of the main body, the first boundary of the second receiving groove is a top surface of the supporting bar, and the second boundary of the second receiving groove is a lateral surface of the cover.

11. The bracket of claim 2, wherein two first connecting portions and two second connecting portions are formed on the adjacent surfaces of the first and second supporting seats, respectively, and each of the first connecting portions is engagable with a corresponding second connecting portion.

12. The bracket of claim 11, wherein each first connecting portion comprises a hole, and each second connecting portion is a detent engagable in the hole of the corresponding first connecting portion.

13. The bracket of claim 12, wherein the first supporting seat comprises two operating portions connected to the second connecting portions, respectively, the operating portions configured for manual operation by a user.

14. The bracket of claim 1, wherein an electrical connecter protrudes from the first supporting seat and is adapted for electrically connecting with the electronic device.

15. An electronic device assembly comprising:
    an electronic device; and
    a bracket for holding the electronic device, the bracket comprising:
      a first supporting seat comprising a cubic main body, a supporting bar and a cover, the supporting bar and the cover cooperatively forming an L-shaped configuration at a same side of the main body, and the main body, the supporting bar and the cover cooperatively defining a first receiving groove therebetween; and a second supporting seat defining a second receiving groove therein;

wherein the first supporting seat is disengagably attachable to the second supporting seat according to each of two selectable arrangements;

in a first one of the arrangements, the first receiving groove and the second receiving groove cooperatively define a first receiving chamber having a first width for holding the electronic device in a first orientation; and in a second one of the arrangements, the first receiving groove and the second receiving groove cooperatively define a second receiving chamber having a second width for holding the electronic device in a second orientation.

16. The electronic device assembly of claim 15, wherein the second supporting seat comprises a cubic main body, a supporting bar and a cover, the supporting bar and the cover cooperatively form an L-shaped configuration at a same side of the main body, and the main body, the supporting bar and the cover cooperatively define the second receiving groove therebetween.

17. The electronic device assembly of claim 16, wherein in the first arrangement, top surfaces of the supporting bars of the first and second supporting seats are aligned with each other and cooperatively form a bottom boundary of the first receiving chamber, and a lateral surface of the cover of the first supporting seat and a lateral surface of the cover of the second supporting seat are located at lateral sides of the bottom boundary and function as lateral boundaries of the first receiving chamber.

18. The electronic device assembly of claim 17, wherein in the second arrangement, the lateral surface of the cover of the first supporting seat and the lateral surface of the cover of the second supporting seat are aligned with each other and cooperatively form a bottom boundary of the second receiving chamber, and the top surfaces of the supporting bars of the first and second supporting seats are located at lateral sides of the bottom boundary and function as lateral boundaries of the second receiving chamber.

19. The electronic device assembly of claim 17, wherein a length of the top surface of the supporting bar of the first supporting seat is larger than that of the top surface of the supporting bar of the second supporting seat, and a length of the lateral surface of the cover of the first supporting seat is approximately equal to that of the lateral surface of the cover of the second supporting seat and is larger than that of the top surface of the supporting bar of the second supporting seat.

20. A bracket for supporting an electronic device, the bracket comprising:

a first supporting seat comprising a cubic main body, a supporting bar and a cover, the supporting bar and the cover cooperatively forming an L-shaped configuration at a same side of the main body, the first supporting seat defining a first receiving groove therein, the first receiving groove comprising a first boundary and a second boundary adjoining the first boundary, the first boundary of the first receiving groove being a top surface of the supporting bar, and the second boundary of the first receiving groove being a lateral surface of the cover, two first latching portions defined in two adjacent surfaces of the main body, respectively, and the first latching portions extending along directions parallel to the first boundary and the second boundary of the first receiving groove, respectively, each first latching portion comprising a groove; and a second supporting seat defining a second receiving groove therein, the second receiving groove comprising a first boundary and a second boundary adjoining the first boundary, two second latching portions formed at two adjacent surfaces of the second supporting seat, respectively, the two second latching portions extending along directions parallel to the first boundary and the second boundary of the second receiving groove, respectively, and each second latching portion comprising a protruding plate slidingly receivable in the groove of the corresponding first latching portion to assemble the first and second supporting seats together;

wherein the first supporting seat is disengagably attachable to the second supporting seat according to each of two selectable arrangements;

in a first one of the arrangements, the first receiving groove and the second receiving groove cooperatively define a first receiving chamber having a first width for holding the electronic device in a first orientation; and in a second one of the arrangements, the first receiving groove and the second receiving groove cooperatively define a second receiving chamber having a second width for holding the electronic device in a second orientation.

\* \* \* \* \*